L. F. BANCROFT.

Assignor to himself and A. B. Yetter.

STREET-SPRINKLERS.

No. 7,877. Reissued Sept. 11, 1877.

Witnesses:

Geo. H. Miatt

M. L. Adams.

Inventor:

Lorey F. Bancroft

By Geo. E. Quincy

Atty.

N. PETERS, PHOTO-LITHOGRAPHER, WASHINGTON, D. C.

UNITED STATES PATENT OFFICE.

LOREY F. BANCROFT, OF WORCESTER, MASSACHUSETTS, ASSIGNOR TO HIMSELF AND ANDREW B. YETTER, OF NEW YORK CITY.

IMPROVEMENT IN STREET-SPRINKLERS.

Specification forming part of Letters Patent No. 124,657, dated March 19, 1872; Reissue No. 7,877, dated September 11, 1877; application filed July 11, 1877.

*To all whom it may concern:*

Be it known that I, LOREY F. BANCROFT, of Worcester, Massachusetts, have invented certain Improvements in Street-Sprinklers, of which the following is a specification:

The object of my improvement is to relieve the driver of a street-watering cart from the necessity of using either hand for operating the valve mechanism which controls the supply of water to the sprinkler.

My invention consists primarily in a valve-actuating lever or bar, which is arranged in front of the tank, and projects above the foot-board in convenient proximity to the driver's seat, and is adapted to be operated by the foot of the driver, who thus has his hands left free for the management of his team.

My invention also includes devices for facilitating the operation in like manner of two or more valves for separately controlling the supply of water to two or more separate compartments in a divided sprinkler.

Finally, my improvement embraces certain details of construction incidental to the main object of my invention, and which are fully set forth in the following description.

The accompanying drawings illustrate my invention as applied to a watering-cart having a sprinkler divided into three compartments, and hence having three valves for admitting water into the sprinkler.

Figure 2:
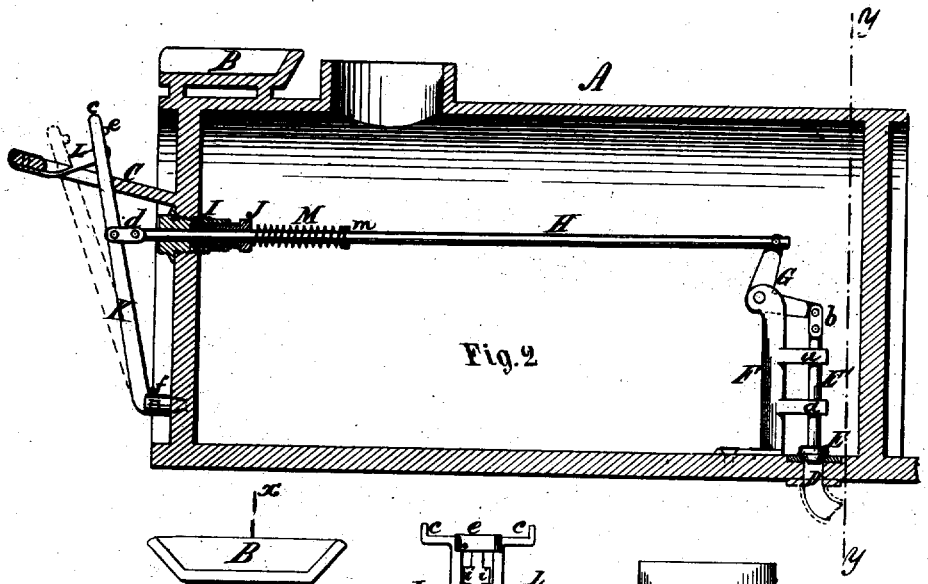
Figure 1:
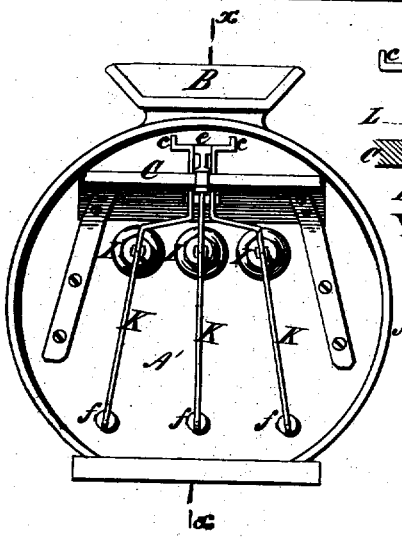
Figure 4:
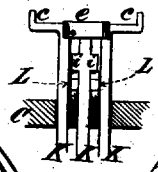
Figure 3:
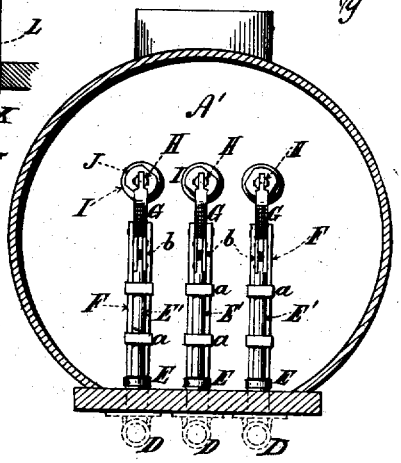
Figure 5:
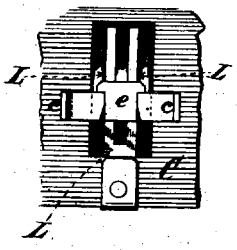

Figure 1 is a view of the front end of the water-tank. Fig. 2 is a central vertical section of the tank through the line *x x* on Fig. 1. Fig. 3 is a transverse vertical section of the tank through the line *y y* on Fig. 2. Fig. 4 is a rear view, on an enlarged scale, of the foot-lever and latch devices. Fig. 5 is a plan of the same, on a like enlarged scale.

Referring to the drawings, A represents the water tank or reservoir of a street-sprinkling cart, provided with the usual driver's seat B and foot-board C. Passages or pipes D D D, are provided for supplying water from the tank to the several compartments of a perforated semicircular discharger, made as described in Letters Patent No. 101,700, granted to John A. Bancroft *et al.*, April 12, 1870. The pipes D D D are closed by valves E, made of rubber or metal, and having long upwardly-projecting spindles E′, which are provided with vertical bearings through the ends of the horizontal arms *a*, which project from the rear side of the upright standards F. Bell-crank levers G are pivoted to the tops of the standards F. The horizontal arm of each of the levers G is connected with the upper end of the valve-spindle E′, by means of the short pitman or link *b*. The upright arm of each of the levers G is pivoted to the end of one of the valve-rods H. The three valve-rods extend forward through stuffing-boxes I arranged in the front end or head A′ of the tank. These stuffing-boxes are made of the form shown, and are screwed into openings formed in the head A′, until their external flange rests against the outer surface of the head. The packing-nuts J are screwed into the boxes I from the interior of the tank, and the packing within the boxes I forms water-tight joints and prevents leakage around the rods H, which latter, being made smooth, can be easily slid back and forth through the boxes for operating the valves E, and thus opening and closing the passages D.

The forward end of each of the rods H is attached, by means of a link, *d*, to one of the foot-levers K, which have their lower ends pivoted in studs *f*, secured to the lower part of the head A′, while their upper ends project up through a slot in the central part of the foot-board C, in the manner illustrated in the drawing. The side levers are turned inward above their junction with the valve-rods, so that all the levers pass through the foot-board in close proximity to each other. The center lever is provided with a cross-head, *e*, at its upper end, and the side levers are turned outward at a level with the cross-head of the center lever, to form a sufficient space for the foot, beyond which their extremities are turned upward to form side lugs, as shown at *c*. A portion of the ends of the cross-head *e* are extended past the rear corners of the side levers, so that by placing his foot on the cross-head *e* the driver can press forward all three of the levers together. A double spring-latch, L, is attached to the foot-board C, the two ends of which extend back through the spaces between the levers, as indicated, and when the levers are pressed forward to open the valves the latch L catches onto lugs *i*, formed on the sides of the central lever, and thereby retains the levers in the position indicated by dotted lines, Fig. 2, thus keeping the valves E open until the latch is tripped and the levers released, when the valves will be instantly closed by the action of the coiled wire springs M, which are arranged around the valve-rods H, with one of their ends pressing against the packing-nuts J, and the others against the pins *m*, set through the rods.

It will be understood that a different arrangement of springs may be used from that herein shown, and said springs may be combined with the levers or rods on the exterior of the tank or in the interior. Weights may also be used for closing the valves, when desired; but I prefer the construction herein shown.

If the driver desires to shut off the water from one side of the discharger while passing carriages, or while running near the sidewalk, he releases the lever corresponding to the side he desires to shut, by springing the upper end of said lever outward, so that it will pass by the end of the cross-head *e*, and if he desires to shut off all the water he trips the latch L by pressing down its rear end with his heel. Lugs may be formed on the side levers, to catch onto the latch L in a manner similar to the central lever, if desired, or a separate latch may be provided for that purpose, so as to hold one of said side levers independent of the central lever. In lieu of the spindle-valves E E′, as herein shown, a simple clapper-valve may be used in connection with the bell-crank levers G and valve-rods H. The running-gear or truck of the watering-cart, being of ordinary and well-known construction, is not shown in the drawings, and I, therefore, do not deem it necessary to describe it.

It will be seen that by means of the valve-gear and the foot-lever arranged in combination with the valve-gear, as herein shown and described, the driver can operate either one or more of the valves with his feet, and thus can easily and conveniently regulate and control the supply of water to the sprinkler while keeping his position upon the seat B. The driver thus has both hands free for the management of his team.

I am aware that a gate has been arranged at the junction of the eduction-pipe with the sprinkler, and that such gate has been operated by means of a pitman connecting with a horizontal lever pivoted to a standard on the top of the tank and extending forward to the front of the tank, and there connected with a treadle mounted upon a horizontal pivot just above the foot-board.

I do not, therefore, claim, broadly, a valve in a street-sprinkler adapted to be operated by the foot of the driver.

I claim as my invention in a watering-cart or street-sprinkler—

1. A valve for controlling the flow of water from a tank into a sprinkler, and a valve-rod for operating such valve, in combination with a stuffing-box, I, in the forward end of the tank, and an actuating-bar arranged in front of the tank, substantially as and for the purpose set forth.

2. The combination, with the tank in a street-sprinkler, of two or more valve-rods and two or more foot-levers, a holding mechanism, and a closing mechanism, whereby either one or more of the valves is adapted to be independently opened or closed by the foot of the driver, substantially as and for the purpose set forth.

3. The combination of the valve-rods H, arranged through stuffing-boxes in the front end of the tank, with the foot-levers K *e c*, latch device L, and spring M, substantially as and for the purposes set forth.

4. The combination and relative arrangement, with the passages D and valve-rods H, of the spindle-valves E E′, standards F and *a*, bell-crank levers G, and links *b*, substantially as shown and described.

LOREY F. BANCROFT.

Witnesses:

HENRY L. PARKER,
LOUISE PROUTY.